INVENTORS
KURT RÄNTSCH
ADOLF WEYRAUCH
HEINRICH STAADEN
BY Edmund M. Jeskiewicz
ATTORNEY

INVENTORS
KURT RÄNTSCH
ADOLF WEYRAUCH
HEINRICH STAADEN

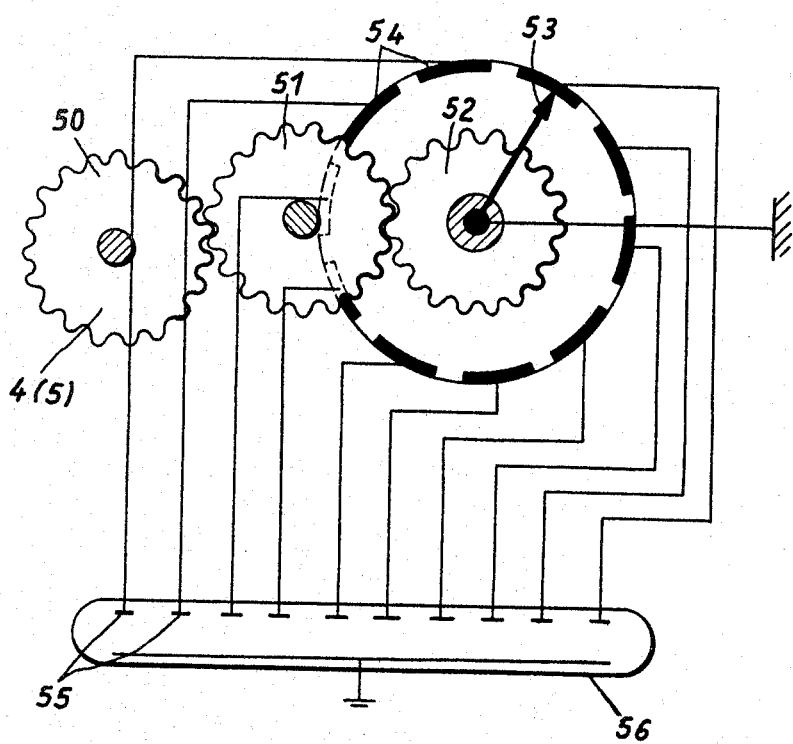

United States Patent Office 3,382,369
Patented May 7, 1968

3,382,369
TWO STAGE READING DEVICE FOR LENGTH AND ANGLE MEASURING SCALES
Kurt Räntsch and Adolf Weyrauch, Wetzlar (Lahn), and Heinrich Staaden, Braunfels, near Wetzlar, Germany, assignors to M. Hensoldt & Sohne, Optische Werke Ag., Wetzlar (Lahn), Germany
Filed Dec. 26, 1963, Ser. No. 333,507
Claims priority, application Germany, Jan. 5, 1963, H 47,885
13 Claims. (Cl. 250—237)

ABSTRACT OF THE DISCLOSURE

An apparatus for the measurement of the displacement of an object displaceable in a pre-determined direction wherein mechanical means drives a coarse register and an optical means drives a fine register and there being first and second differentials connected in series between the registers and the optical and mechanical drives therefor and a reduction drive between the optical means and the coarse register.

---

The present invention relates to a measuring device and in particular to an indicating measuring device having a register for indicating coarse measurements and a register for indicating fine measurements. The measuring device according to the present invention can be employed for measuring linear distances or the length over curved surfaces, and in the latter case, the indications can be given in angles.

Devices according to the prior art having two registers or a two-stage register have generally been of an optical and electronic nature. The optical devices heretofore known generally do not have any digital registers but when a digital indicator is provided, the fine measurement value is usually indicated by digits and the coarse measurement value is indicated by scale subdivisions.

A system of this nature has the disadvantage that when a scale interval is registered adjacent a digital value, the markings on the scale will generally fail to register clearly with the digital values and it becomes impossible to bring the indicated numerical value to zero in any arbitrary setting although this is absolutely when such a measuring device is used for accurate measurements such as are encountered in connection with machine tools.

Electronic registers have the disadvantage of being very complex particularly as to the electronic components and are thus extremely expensive.

Still another known two-stage measuring device includes two digital registers, one of which is a coarse measurement indicator and the other of which is a fine measurement indicator. This apparatus is constructed in such a manner that the measured ranges can be quickly transferred and during transferral only the coarse measurement device is actuated while thereafter, by means of a supplementary motor, the fine measurement device is actuated. The coarse measurement register is connected through a differential to the fine measurement register to properly relate the two registers. A device of this nature is quite expensive and is complex and requires a special counting mechanism.

The present invention has as a particular object the provision of a measuring device of the nature referred to which will indicate both coarse and fine readings by means of conventional counters so that these measurements can easily be read from the numerical indications of the counters. Another object of the present invention is the provision of a relatively inexpensive device of the nature referred to.

Still another object of this invention is a highly accurate measuring device having both coarse measurement and fine measurement indicating devices interconnected so that proper exact readings can always be read from the indicating counters of the device.

The present invention accomplishes the foregoing objectives by having a coarse measurement indicator or register or counter and a fine measurement indicator or register or counter in such a manner that the fine measurement device can be operated first to return it to a zero position, and then the coarse measurement device to return it through the interval that was registered by the fine measurement device.

In conventional multi-roller counters, the roller in the lowest decimal place rotates continuously and the other rollers index a tenth revolution for each revolution of the roller next adjacent thereto toward the right. The digits displayed by such a counter are thus always in their correct positions.

In the present invention the coarse measurement counter is arranged for being mechanically driven by the fine measurement counter and also by a coordinating mechanism between the two counters so that the summation of the movement of the fine measurement counter and that of the coordinating mechanism is delivered to the coarse measurement counter whereby the reading thereof will be the correct amount. Relatively simple differential drive means is effective for establishing the aforementioned connection.

The coordination of the coarse and fine measuring mechanisms is advantageously accomplished by optical means that include the forming of an image of a mark on a graduated scale over which the entire device moves. The device includes means for shifting the image and by photoelectric means the exact location of the image can be determined when the photoelectric means comes into balance.

In one case the shifting means can be accomplished by a tiltable transparent disc having its opposite faces parallel and which is tilted by an adjustment of the screw, the movement of which is delivered to the mechanism that controls the counters.

Another useful arrangement for shifting the image takes the form of a rhombic prism mounted on an angularly adjustable disc such as a gear. This arrangement has the advantage that the indicator can always be adjusted for observation by the machine operator regardless of the direction of the graduated measuring scale relative thereto.

A measuring device according to the present invention, particularly where the rhombic prism is employed, can be easily fitted to a machine for effecting measurements. The coarse measurement can advantageously be effected by means of a rack or pinion, and an arrangement is provided for directly driving the coarse measurement counter from the rack or pinion. The fine measurement counter is operated in response to movement of the rhombic prism which, as mentioned before, can be aligned with the graduation in whatever direction the latter extends merely by adjusting the prism on its carrier to the proper position.

It will be understood that the centralization of the image can also be accomplished by a grid or a collimating slit or the like according to known practices.

In one modification the fine measurement counter has a spur gear connected with the digit roller in the highest decimal place at a gear ratio of 1 to 10 and this gear is connected through a second differential with a gear pertaining to the roller in the lowest decimal position of the coarse measurement counter. Both counters are preferably constructed so that they can readily be brought back to a zero setting and preferably simultaneously.

While the counters referred to have been of the digital type having rollers with numbers imprinted thereon, it will be understood that the registration could be accomplished electrically or electronically, by suitable tubes and by connecting the tubes in circuit with contacts swept over by brushes that move in the same manner as the counter rollers referred to.

Still further, when the brushes are employed, relays and the like can be actuated and these in turn can control the printers or the like, all as known in the art.

The exact nature of the present invention will become more apparent upon reference to the following specification taken in connection with the accompanying drawings, in which:

FIGURE 7 shows a modified construction in which a rotating brush carries out the function of the rotatable numbered rollers of the counters of FIGURE 2.

Figure 1:
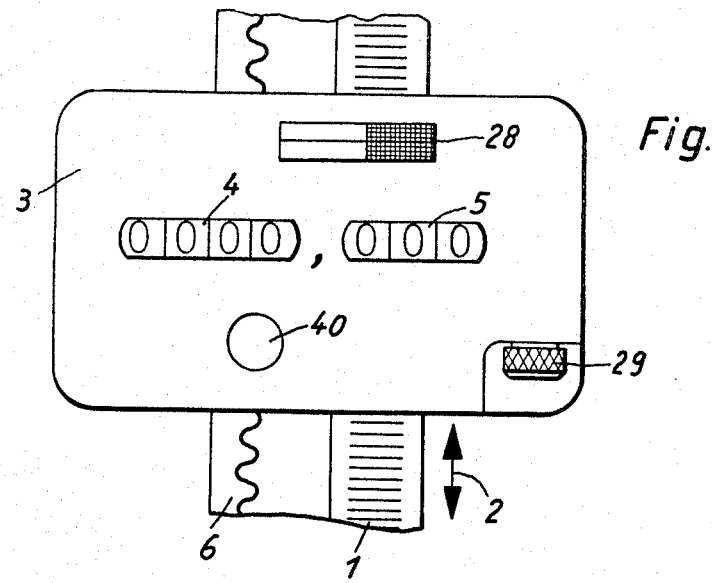
FIGURE 1 is a front view of a measuring device according to the present invention.

Referring to the drawings somewhat more in detail, in the arrangement shown in FIGURE 1 a graduated measuring scale 1 is mounted upon and movable with the carriage of a machined tool or the like in the direction of the length of the scale as indicated by double arrow 2. Stationarily mounted on the bed of the machine is an indicating measuring device which has two multi-roll numerical registers 4, 5 for indicating the amount of movement of the carriage on the bed.

Figure 3:
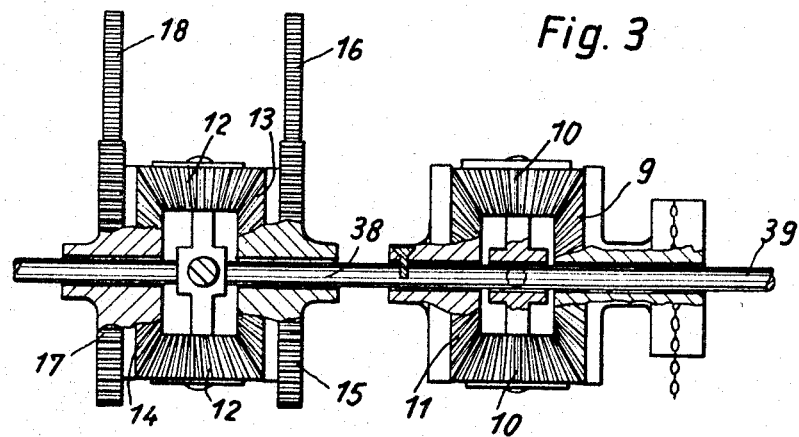
FIGURE 3 is a sectional view indicated by line 3—3 on FIGURE 2 showing the differential gearing for driving the counters.
Figure 2:
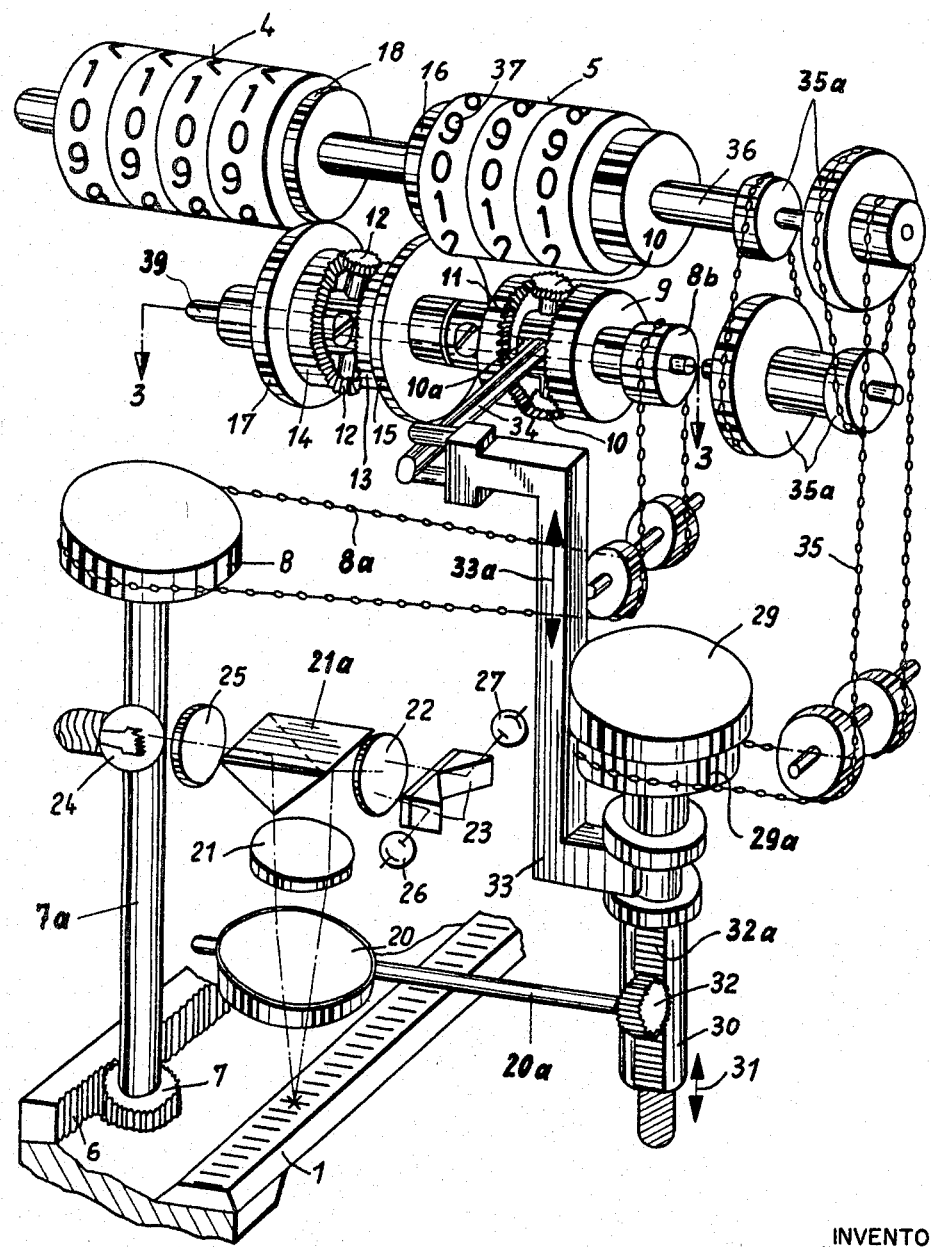
FIGURE 2 is a perspective view, somewhat schematic of the entire organization of the device of the present invention.

FIGURE 2 shows the construction of the measuring device in perspective and somewhat schematically. The carriage of the machine indicated at 1a not only has fixedly connected thereto the graduated scale 1 but also a rack 6. Rack 6 meshes with the pinion 7 mounted on a shaft 7a rotatable in the measuring device 3. Shaft 7a carries a sprocket 8 about which is entrained a chain 8a which also passes over sprocket 8b which is fixed to a crown gear 9 as will be seen in FIGURE 3. Crown gear 9 is a part of a differential which has planet bevel pinions 10 mounted on a carrier 10a and which bevel pinions also mesh with a second crown gear 11 fixed to a shaft 39.

Shaft 39 is rotatable relative to carrier 10a and extends into a second differential unit and is fixed to a carrier 12a for the bevel planet pinions 12 that meshes with crown gears 13 and 14 both of which are rotatable on shaft 39.

Crown gear 13 is fixed to a spur gear 15 that meshes with spur gear 16 that is associated with the highest decimal roll 37 of the counter 5. Specifically, there is a one to ten drive ratio between gear 16 and roller 37 so that for each complete rotation of roller 37 gear 16 will turn one tenth of a revolution or 36°.

Fixed to crown gear 14 is a spur gear 17 the same size as gear 15 and meshing with gear 17 is another gear 18 the same size as gear 16. Gear 18 is connected with the lowest decimal roller of coarse measurement counter 4 and is so related thereto that a tenth revolution of gear 18 will cause a tenth of a revolution of the adjacent roller of counter 4.

The graduated scale 1 is availed of for effecting fine measurements. This is done by providing a light source 24, the light from which passes through a lens 25 to a reflecting prism or mirror 21a which deflects the light downwardly through lens 21 and transparent disc 20 to graduated scale 1.

The light reflected from the scale passes back through disc 20 and lens 21 to reflecting prism 21a and then through lens 22 to the double prism 23 where the light beam is divided and diverted laterally to the two photocells 26 and 27. These photocells are connected in circuit so that it can be determined when they are equally illuminated. This could be done, for example, by connecting them in circuit in a known manner with a magic eye 28, indicated in FIGURE 1. This eye will indicate when the cells 26 and 27 are equally illuminated.

If the mark to be observed is not exactly on the optical axis of the system, the plate 20 is tilted to move the image laterally so that photocells 26 and 27 become equally illuminated. This is accomplished by rotation of screw 29 which is threaded to sleeve 30 movable in the direction of the double arrow 21. A pinion 32 meshing with rack portion 32a of sleeve 30 is mounted on shaft 20a which also carries disc 20.

Also connected with sleeve 32a is an arm 33 which is movable in the direction of double arrow 33a when screw 29 is rotated. Arm 33 is connected by lever 34 with carrier 10a of the bevel planet pinions 10.

Screw 29 also has a sprocket 29a over which is entrained a chain 35 that drives through the motion multiplying mechanism 35a into the lowest decimal digit roll of the fine measurement counter 4.

In operation, device 3, on the one hand, and graduated scale 1 and rack 6 on the other hand, move relatively, and during this movement, pinion 7 rolls on rack 6 thus driving shaft 7a and sprocket 8 and therethrough driving chain 8a so that sprocket 8b is driven in rotation, thereby rotating crown gear 9. Bevel pinions 10 at this time rotate on fixed axes and rotation of crown gear 9 will therefore drive crown gear 11 which is fixed to shaft 39.

Shaft 39 drives carrier 12a of bevel pinions 12 and, inasmuch as gears 15 and 16 cannot rotate, crown gear 13 will not rotate and therefore crown gear 14 will be driven by bevel pinions 12. Rotation of crown gear 14 causes rotation of spur gear 17 and this, in turn, drives gear 18 located at the input end of coarse measurement counter 4. Each 36° of rotation of gear 18 will be accomplished by a jump forward of one position of the numbered wheel in the lowest decimal place of counter 4.

After the relative movement of the device and the graduated scale comes to a halt, the magic eye 28 can be observed to ascertain whether the observed mark on scale 1 is on the optical axis of the optical system. If this mark is on the axis, then the indication on counter 4 gives the exact distance of travel of graduated scale 1 and device 3 relatively. If this mark is not on the axis, then the measuring screw 29 is rotated and this will cause vertical movement of sleeve 30 which will drive pinion 32 and shaft 20a and thereby tilt disc 20 so as to displace the image of the observed mark until photocells 26 and 27 are equally illuminated and which will be indicated by magic eye 28.

Rotation of screw 29, in addition to moving sleeve 30 to tilt disc 20, will also drive chain 35 which, through the multiplying mechanism 35a will feed into the fine measurement counter 5. When magic eye 28 indicates a condition of balance between photocells 26 and 27, the indication on fine measurement counter 5 will show the fractional amount that the device and scale have moved relatively between a pair of adjacent scale marks.

The aforementioned movement of sleeve 30 also operates through arm 33 to tilt arm 34, thus causing movement of carrier 10a of bevel pinions 10. At this time crown gear 9 is held stationary by chain 8a and tilting of carrier 10a thus causing rotation of crown gear 11 which is transmitted through shaft 39 to carrier 12a of bevel pinions 12.

As before, crown gear 13 is at this time held stationary so that movement of carrier 12a will result in rotation of crown gear 14 and of gears 17 and 18 for influencing the coarse measurement counter as previously described. Ordinarily this movement of gear 18 is only a fraction of a measuring interval and coarse measurement counter 4 will thus ordinarily not jump forward except when the adjustment of screw 29 is such that gear 18 is driven through at least 36°.

In the making of the fine measurement, it may occur that counter will pass beyond its highest position, namely, 999 so that the next indication that will be read thereon will be 000. Under these circumstances, the coarse measuring counter will have to move one unit ahead. This movement of the rough measurement counter is accomplished through the differential gearing connecting gears 16 and 18.

When counter 5 turns from 999 to 000, gear 16 will be rotated a tenth of a revolution and this will be transmitted to gear 15 and then through the differential to gear 17 and then into gear 18 which will cause sufficient movement of gear 18 to cause counter 4 to jump ahead one unit.

During an adjustment of this nature, arm 34 swings in a direction to cause gear 18 to be first turned back so that the aforementioned jump does not occur until counter 5 turns over to 000. Following a measurement, the button 40 of FIGURE 1 can be operated to turn both counters to a zero position. Reset mechanisms of this nature are known in the art and are not specifically disclosed in this application.

Figure 4:
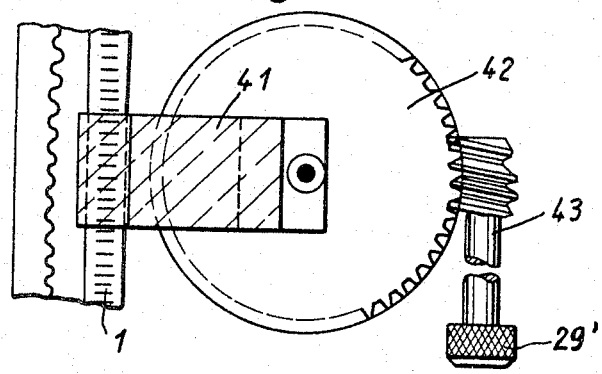
FIGURE 4 is a view showing a modification wherein the adjustable element for shifting the image in the form of a rhombic prism.
Figure 5:
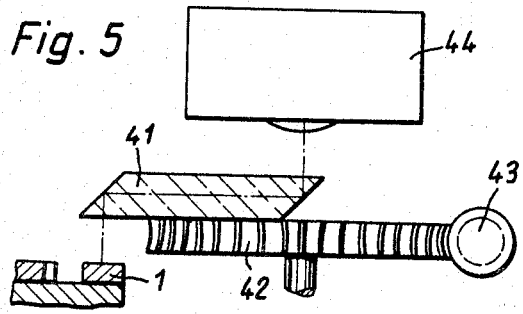
FIGURE 5 is a side view of FIGURE 4.

FIGURES 4 and 5 show a modification wherein a rhombic prism 41 is mounted on a worm gear 42 which is angularly adjustable by a worm 43 pertaining to which is adjustment knob 29'. Rotation of gear 42 will cause shifting of the image of the observed mark relative to the photocell means 44 in the same manner described previously.

An advantage of the rhombic prism is that worm wheel 42 can be turned to any angular position so that the axis of the rhombic prism is at right angles to the length of scale 41. This can be readily accomplished, for example, by disengaging worm 43 from worm wheel 42 and turning the worm wheel to the desired new position to position the rhombic prism and scale relatively in the described manner.

Figure 6:
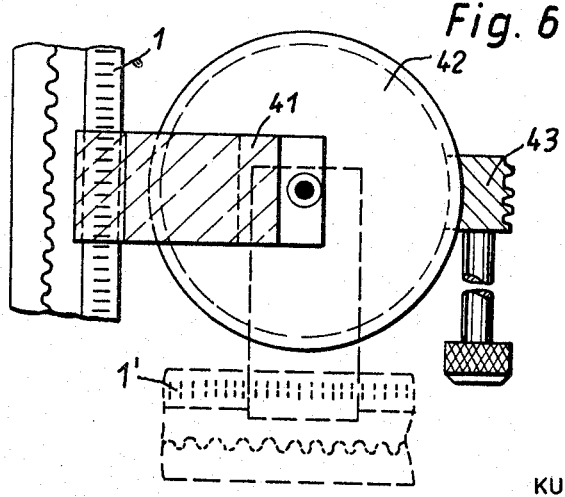
FIGURE 6 shows how the FIGURE 4 arrangement could be modified when the graduated measuring scale extends in a different direction.

FIGURE 6 shows dot-dash in outline one such adjusted position.

In the modification described above, the counters have had numbered wheels, but it will be evident that other indicating means could be employed such as electron tubes having cathodes or the like therein in the form of digits and which cathodes are adapted for selective energization so that one only of the digits therein is illuminated at any one time.

FIGURE 7 shows somewhat diagrammatically a modification of this nature. The digit rollers of the counters 4 or 5 have connected thereto gears 50 meshing with gears 51 that, in turn, mesh with gears 52. Gears 52 will turn at a one to one ratio relative to the digit counters and carry brushes 53 that sweep over contacts 54 that are connected to the cathodes 55 of an indicating tube 56.

Depending on the location of each brush 53, a certain digit will be illuminated in the pertaining tube. In this case, of course, the numbered rollers could be eliminated, or they could be retained on the device and the indicating tube be positioned in another location such as a remote location. It will also be evident that the electric signals created by movement of the brushes could be used for control operations such as the control of a printer or the like, or for controlling the operation of the machine with which the device was associated.

It will be understood that this invention is susceptible to modification in order to adapt it to different usages and conditions; and accordingly, it is desired to comprehend such modifications within this invention as may fall within the scope of the appended claims.

What we claim is.

1. In an apparatus for the measurement of the displacement of an object displaceable in a pre-determined direction, a graduated scale on said object along the direction of displacement, means for indicating digitally the amount of displacement of said object, said means comprising a coarse multi-roll digital jump register with said rolls being interconnected in tens transmissions and a fine multi-roll digital jump register with said rolls being interconnected to tens transmission, means connected to said coarse register for driving said register in response to the displacement of said displaceable object, adjustable means cooperating with said scale and connected to said fine digital register for driving said register to compensate for the position of the object with respect to adjacent scale gradations, and interconnecting means between said coarse and fine registers and between said coarse register and said coarse register driving means and said adjustable means with reduction drive means between said interconnecting means and said adjustable means for driving through said reduction drive means the lowest decimal roll of the coarse register in the opposite direction and through the same distance that the fine register is driven in response to said adjustable means.

2. In an apparatus as claimed in claim 1 wherein said means for driving the lowest decimal roll of the coarse register comprises first and second differentials connected in series and operatively connected to the highest decimal roll of said fine jump register and the lowest decimal roll of said coarse jump register.

3. In an apparatus according to claim 1 which includes reset means for resetting both of said registers to zero.

4. In an apparatus according to claim 1 in which said registers include electrically operable means, and movable brush elements for energizing said electrically operable means and actuated in response to driving of said coarse measurement indicator and actuation of said fine measurement indicator.

5. In an apparatus according to claim 4 in which said registers include digit rolls and wherein each digit roll drives a respective brush means at a 1 to 1 ratio.

6. In an apparatus as claimed in claim 1 and further comprising a rack fixed on said displacable object, said coarse register driving means having a pinion drivingly connected to said rack, and fine register driving means comprising an adjustable member and optical image deflecting means for producing an image of a gradation and for centralizing said image in a pre-determined position.

7. In an apparatus according to claim 6 in which said optical image deflecting means comprises a transparent plate having parallel sides and connected to said member so that adjustment of said member will tilt said plate.

8. In an apparatus according to claim 6 in which said optical image deflecting means comprises a rhombic prism, and means rotatably supporting said prism and connected to said member of actuation thereby.

9. In an apparatus according to claim 6 in which said optical image deflecting means comprises a rhombic prism, a rotatable element supporting said prism so the one end of the prism is at the center of the element while the other end is at the edge of the element, and gear means connecting the element with the member for rotation of the element by the member.

10. In an apparatus as claimed in claim 6 wherein each of said differentials comprises an input element and an output element and a reaction element, said pinion being drivingly connected to the input element of said first differential, the output element of said first differential being drivingly connected to the input element of said second differential, the output element of said second differential being drivingly connected to the lowest decimal roll of said coarse register, the reaction element of said first differential being operatively connected to said adjustable member, and the reaction element of said second differential being drivingly connected to the highest decimal roll of said fine register for actuation thereby.

11. In an apparatus as claimed in claim 6 wherein said optical means comprises a pair of photo cells on which said image falls, means operated by said adjustable member for centralizing said image relative to said photo cells, and means cooperating with said photo cells to indicate a condition of centralization of said image.

12. In an apparatus as claimed in claim 6 wherein said first and second differentials comprise a first driving connection between said pinion and the lowest decimal roll of said coarse register, a second driving connection between said adjustable member and the lowest decimal roll of said fine register, a third driving connection between said adjustable member and said first differential, and a fourth driving connection between the highest decimal roll of said fine register to said second differential.

13. In an apparatus according to claim 12 in which said fourth driving connection comprises a spur gear driven at 1:10 from the highest decimal place digit roll of said fine measurement register.

References Cited

UNITED STATES PATENTS

| | | | |
|---|---|---|---|
| 2,916,961 | 12/1959 | Schwidefsky | 88—14 |
| 2,980,328 | 4/1961 | Jacobson et al. | 235—136 |
| 3,068,741 | 12/1961 | Werner | 88—14 |
| 3,076,374 | 2/1963 | DeNeergaard | 250—231 X |
| 3,083,570 | 4/1963 | Truman | 235—103.5 X |
| 3,197,648 | 7/1965 | Gasch et al. | 250—237 X |

RALPH G. NILSON, *Primary Examiner.*

J. D. WALL, M. A. LEAVITT, *Assistant Examiners.*